US012749165B2

(12) United States Patent
Zhang et al.

(10) Patent No.: US 12,749,165 B2
(45) Date of Patent: Sep. 29, 2026

(54) MACHINE LEARNING MODEL-BASED IMAGE NOISE SYNTHESIS

(71) Applicants: Disney Enterprises, Inc., Burbank, CA (US); ETH Zürich (EIDGENÖSSISCHE TECHNISCHE HOCHSCHULE ZÜRICH), Zurich (CH)

(72) Inventors: Yang Zhang, Dübendorf (CH); Mingyang Song, Zurich (CH); Tunc Ozan Aydin, Zürich (CH); Elham Amin Mansour, Zürich (CH); Christopher Richard Schroers, Uster (CH); Abdelaziz Djelouah, Zürich (CH); Roberto Gerson de Albuquerque Azevedo, Zürich (CH)

(73) Assignees: Disney Enterprises, Inc., Burbank, CA (US); ETH Zurich (Eidgenossische Technische Hochschule Zurich), Zurich (CH)

( * ) Notice: Subject to any disclaimer, the term of this patent is extended or adjusted under 35 U.S.C. 154(b) by 306 days.

(21) Appl. No.: 18/386,827

(22) Filed: Nov. 3, 2023

(65) Prior Publication Data

US 2024/0161252 A1 May 16, 2024

Related U.S. Application Data

(60) Provisional application No. 63/424,368, filed on Nov. 10, 2022.

(51) Int. Cl.
*G06T 5/73* (2024.01)
*G06T 5/50* (2006.01)

(52) U.S. Cl.
CPC .................. *G06T 5/73* (2024.01); *G06T 5/50* (2013.01); *G06T 2207/10024* (2013.01); *G06T 2207/20084* (2013.01)

(58) Field of Classification Search
CPC ... G06T 5/73; G06T 5/50; G06T 2207/10024; G06T 2207/20084; G06T 2207/10016;
(Continued)

(56) References Cited

U.S. PATENT DOCUMENTS 12,482,073 B2 * 11/2025 Choi .......................... G06T 5/50
12,518,356 B2 * 1/2026 Tohme ...................... G06T 5/70
(Continued)

FOREIGN PATENT DOCUMENTS

KR 102210940 B1 * 2/2021 ............... G06T 3/40

OTHER PUBLICATIONS

Yanghao Li, Naiyan Wang, Jiaying Liu, Xiaodi Hou "Demystifying Neural Style Transfer" arXiv Jan. 4, 2017 7 Pgs.
(Continued)

*Primary Examiner* — Jose L Couso
(74) *Attorney, Agent, or Firm* — Farjami & Farjami LLP

(57) ABSTRACT

A system includes a hardware processor, a system memory storing a software code, and a machine learning (ML) model trained using style loss to predict image noise. The hardware processor is configured to execute the software code to receive a clean image and at least one noise setting of a camera used to capture a version of the clean image that includes noise, and provide the clean image and the at least one noise setting as a noise generation input to the ML model. The hardware processor is further configured to execute the software code to generate, using the ML model and based on the noise generation input, a synthesized noise map for renoising the clean image.

20 Claims, 7 Drawing Sheets

(58) Field of Classification Search

CPC ......... G06T 2207/20204; G06T 3/4046; G06T 5/60; G06T 9/002; G06T 2207/20076; G06T 2207/20081; G06T 5/70; G06T 2207/20182; G06T 5/20; G06T 7/90; G06T 11/001; G06T 2207/30168; G06T 11/00; G06T 7/0002; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06V 10/30; G06F 18/214; G06F 18/22; G06F 18/241; G06F 18/24; G06F 18/2411; G06F 18/2415; G06F 30/27; Y10S 128/925; H04N 19/86

See application file for complete search history.

(56) References Cited

U.S. PATENT DOCUMENTS

| | | | | |
|---|---|---|---|---|
| 2020/0342652 | A1* | 10/2020 | Rowell | G06V 10/82 |
| 2021/0390375 | A1* | 12/2021 | Luo | G06V 10/26 |
| 2022/0398695 | A1* | 12/2022 | Choi | G06T 5/60 |
| 2023/0058096 | A1* | 2/2023 | Ferrés | G06T 7/40 |
| 2023/0103966 | A1* | 4/2023 | Choi | G06T 5/50<br>382/100 |
| 2026/0087603 | A1* | 3/2026 | Kreis | G06T 5/70 |

OTHER PUBLICATIONS

Abdelrahman Abdelhamed, Marcus A. Brubaker, Michael S. Brown “Noise Flow: Noise Modeling with Conditional Normalizing Flows” arXiv Aug. 22, 2019 10 Pgs.

Tero Karras, Samuli Laine, Miika Aittala, Janne Hellsten, Jaakko Lehinene, Timo Aila “Analyzing and Improving the Image Quality of StyleGAN” arXiv Dec. 3, 2019 21 Pgs.

Geonwoon Jang, Wooseok Lee, Sanghyun Son, Kyoung Mu Lee “C2V: Practical Generative Noise Modeling for Real-World Denoising”arXiv Sep. 19, 2022 15 Pgs.

Yunhao Zou, Ying Fu “Estimating Fine-Grained Noise Model via Contrastive Learning” arXiv Apr. 3, 2022 10 Pgs.

Liangyu Chen, Xiaojie Chu, Xiangyu Zhang, Jian Sun “Simple Baselines for Image Restoration” arXiv Apr. 10, 2022 21 pgs.

Shayan Kousha, Ali Maleky, Michael S. Brown, Marcus A. Brubaker “Modeling sRGB Camera Noise with Normalizing Flows” arXiv June , 2022 15 Pgs.

Ali Maleky, Shayan Kousha, Micahel S. Brown, Marcus A. Brubaker “Noise2Noise Flow: Realistic Camera Noise Modeling without Clean Images” arXiv Jun. 2, 2022 12 Pgs.

A. Newson, Julie Delon, B. Galerne “A Stochastic Film Grain Model for Resolution-Independent Rendering” Computer Graphics Forum, May 16, 2017 16 Pgs.

Kaixuan Wei, Ying Fu, Jiaolong Yang, Hua Huang “A Physics-based Noise Formation Model for Extreme Low-light Raw Denoising” arXiv Mar. 28, 2020 10 pgs.

“How to Denoise Footage in DaVinci Resolve?” Apr. 27, 2023 TourBox Tech Inc. 10 Pages.

Andrey Norkin, Neil Birkbeck “Film Grain Synthesis for AV1 Video Codec” Mar. 2018 Data Compression Conference 10 Pages.

“Nuke Grain” Nuke 15.0v2 docs User Guide Dec. 23, 2022 5 Pages.

* cited by examiner (a) SNAF Block.

(b) SNAF-NI Block.

MACHINE LEARNING MODEL-BASED IMAGE NOISE SYNTHESIS

RELATED APPLICATIONS

The present application claims the benefit of and priority to a pending U.S. Provisional Patent Application Ser. No. 63/424,368 filed on Nov. 10, 2022, and titled "Machine Learning Techniques For Camera Sensor Noise and Film Grain Modeling," which is hereby incorporated fully by reference into the present application.

BACKGROUND

Film grain and digital camera sensor noise are important characteristics of analog film and digital cameras. In modern digital movie production pipelines, noise often has to be removed for visual effects (VFX) compositing. Noise also has to be removed for optimized data compression. Then, in order to better portray the cinematographic aspect of a film, several post-processing operations are commonly applied to the digital content for adding the noise back to the content. A good noise modeling algorithm is necessary to retain the noise characteristics of the original noise distribution and to synthesize the desired quality the artists intend.

However, existing methods are capable of synthesizing only limited types of noise. For example, the existing method in the AV1 codec produces repetitive noise patterns and lack of randomness in color channels, which makes the synthesized noisy frame unrealistic and distracting. Furthermore, the existing methods cannot accurately model the distribution of the targeted noise source. In other words, the renoising process cannot produce the artistic intent in the video production. Also, the existing methods cannot provide artistic controls, such as specific types of camera sensor noise synthesis or noise synthesis for different camera settings (including ISO levels, shutter speed, and color temperature).

DETAILED DESCRIPTION

Figure 1:
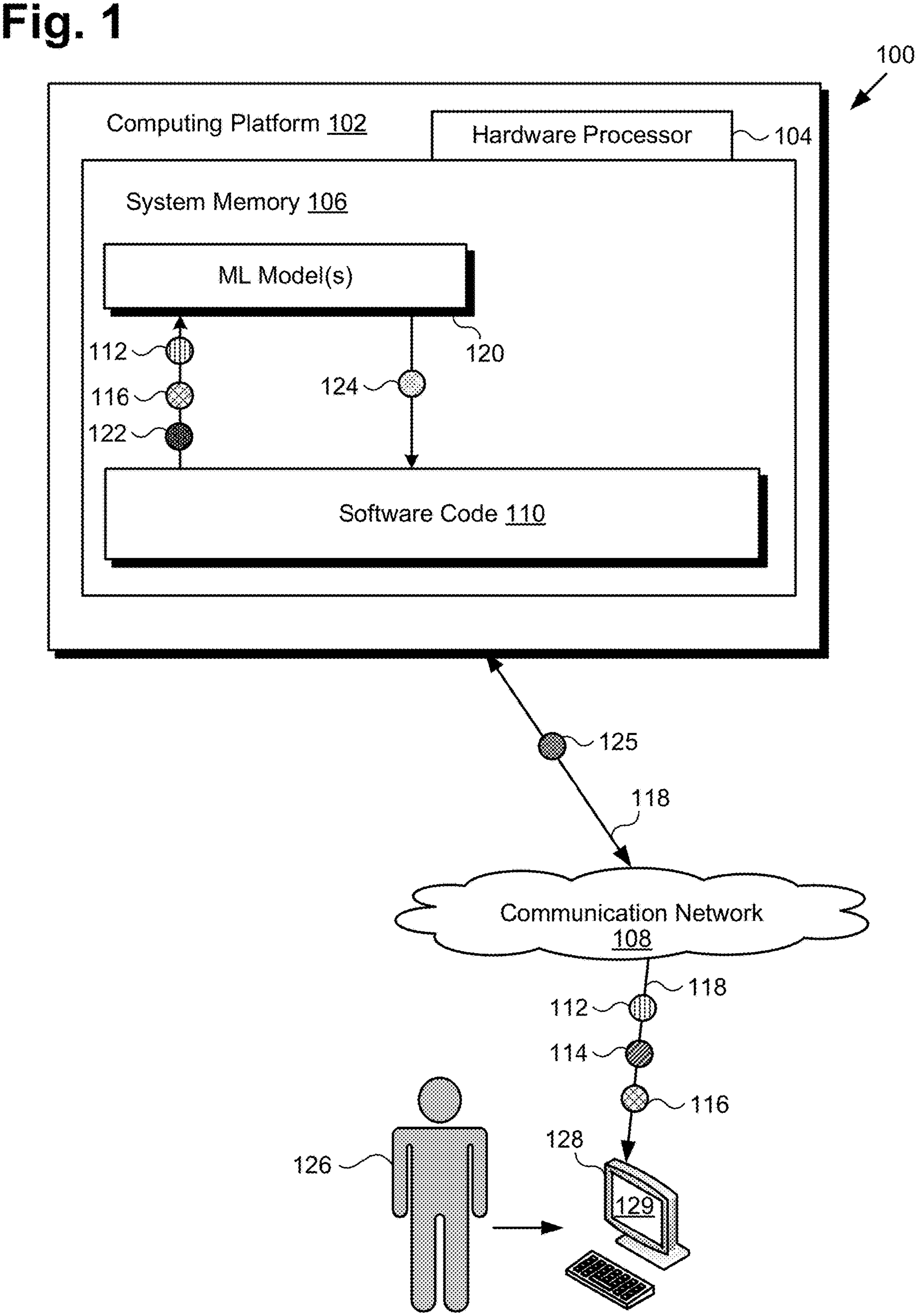
FIG. 1 shows a diagram of a system for performing machine-learning (ML) model-based image noise synthesis, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, film grain noise and digital camera sensor noise (hereinafter "digital camera noise") are important characteristics of analog film and digital cameras. As known in the art, digital camera noise manifests as random variations of brightness or color information in images produced by the image sensor and circuitry of a scanner or digital camera. Film grain noise, by contrast, arises from the random optical texture of processed photographic film due to the presence of small particles of metallic silver, or dye clouds, and results in an optical effect that can be noticeable. It is noted that not only are the respective sources of digital camera noise and film grain noise different, but their respective statistical distributions are typically different as well.

In modern digital movie production pipelines, noise often has to be removed for visual effects (VFX) compositing. Noise also has to be removed for optimized data compression. Then, in order to better portray the cinematographic aspect of a film or other video content, several post-processing operations are commonly applied to the digital content for adding the noise back to the content. A good noise modeling algorithm is necessary to retain the noise characteristics of the original noise distribution and to synthesize the desired quality the artists intend.

As further noted above, existing methods are capable of synthesizing only limited types of noise. For example, the existing method in the AV1 codec produces repetitive noise patterns and lack of randomness in color channels, which makes the synthesized noisy frame unrealistic and distracting. Furthermore, the existing methods cannot accurately model the distribution of the targeted noise source. In other words, the renoising process cannot produce the artistic intent in the film production. Also, the existing methods cannot provide artistic controls, such as specific types of camera sensor noise synthesis, or noise synthesis for different camera settings (including ISO levels, shutter speed, and color temperature).

The present disclosure provides a deep learning method for digital camera noise modeling and synthesis in the raw Red-Green-Blue (raw-RGB) and standard RGB (sRGB) color spaces, as well as film grain image noise modeling and synthesis. With respect to the distinction between raw-RGB images and sRGB images, it is noted that a raw-RGB image represents a scene-referenced digital camera sensor image having RGB values that are specific to the color sensitivities of the color filter array of the sensor, while an sRGB image represents a display-referenced image that has been rendered through the image signal processor (ISP) of the digital camera. The image noise modeling and synthesis solution disclosed in the present application includes at least three key features that advance the existing art: One key feature of the present method is using a deep generative model with noise injection to the network for sensor noise/file grain modeling in raw-RGB and sRGB color spaces. Another key feature is the artistic control mechanism has been designed for generating different types of sensor noise under different camera settings. A further key feature is a generic network design that can be used for multi-camera sensors noise modeling and film grain synthesis.

Moreover, experimental results indicate that, without requiring extensive manual adjustment, the synthesized noisy frames produced by the present image noise modeling and synthesis solution contain visually realistic camera noise or film grain noise without the aforementioned issues in existing tools. Quantitatively, the present solution achieves superior synthesis results by computing the KL (Kullback—Leibler) divergence between the synthesized noise and the ground truth noise.

The present image noise modeling and synthesis solution may automatically synthesize different types of digital camera noise or film grain noise with specific artistic intents, which gives artists more freedom during the image processing passes in a movie production pipeline. As used in the present application, the terms "automation," "automated," "automating," and "automatically" refer to systems and processes that do not require the participation of a human system operator. Although, in some implementations, a system operator or administrator may review or even adjust the performance of the automated systems and according to the automated methods described herein, that human involvement is optional. Thus, the methods described in the present application may be performed under the control of hardware processing components of the disclosed automated systems.

The present image noise modeling and synthesis solution solves the problems encountered in existing approaches, such as the requirement of prior knowledge of what camera noise or film grain noise looks like for the purpose of manually tuning the parameters, tedious manual process for renoising each shot, a limited amount of types of noise, unrealistic or repetitive noise pattern, and lack of randomness in the temporal domain, while enhancing artistic control.

In practice, a dataset with clean-noisy image pairs is used. The machine learning model implemented as part of the present image noise modeling and synthesis solution predicts the residual image (subtracting the clean image from the noisy pairing one), which is denoted herein as the "noise map." The separation of the noise signal and clean image signal makes it much easier for the discriminator model to judge whether a sample belongs to the real distribution. In addition to the clean image, noise settings in the case of digital camera noise, e.g., camera brandmark, ISO sensitivity, shutter speed, and the like, or film grain settings in the case of film grain noise, e.g., grain size, grain amount, and the like, can be fed to the generator as control information. The present image noise modeling and synthesis solution introduces the concept of injecting noise into the generator to imitate the stochastic property of real noise.

As defined in the present application, the expression "machine learning model" (hereinafter "ML model") may refer to a mathematical model for making future predictions based on patterns learned from samples of data or "training data." For example, ML models may be trained to perform image processing, natural language understanding (NLU), and other inferential data processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

FIG. 1 shows exemplary system 100 for performing ML model-based image noise synthesis, according to one implementation. As shown in FIG. 1, system 100 includes computing platform 102 having hardware processor 104 and system memory 106 implemented as a computer-readable non-transitory storage medium. According to the present exemplary implementation, system memory 106 stores software code 110 and one or more ML models 120 (hereinafter "ML model(s) 120") including at least one ML model trained to predict image noise, including digital camera noise or film grain noise.

As further shown in FIG. 1, system 100 is implemented within a use environment including communication network 108, user system 128 including display 129, and user 126 of user system 128. In addition, FIG. 1 shows clean image 112, i.e., a substantially noise-free image, noisy image 114, which is a version of clean image 112 including noise, and one or more noise settings 116 (hereinafter "noise setting(s) 116") received from user system 128, real noise map 122, and synthesized noise 124 map generated by ML model(s) 120. Also shown in FIG. 1 are renoised image 125, i.e., clean image 112 renoised using synthesized noise map 124, and network communication links 118 of communication network 108 interactively connecting system 100 and user system 128.

Although the present application refers to software code 110 and ML model(s) 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, in some implementations, system 100 may utilize a decentralized secure digital ledger in addition to, or in place of, system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110 and ML model(s) 120 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, one or more of software code 110 and ML model(s) 120 may be stored remotely from one another on the distributed memory resources of system 100. It is also noted that, in some implementations, ML model(s) 120 may take the form of one or more software modules included in software code 110.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 108 may be a high-speed network suitable for high performance computing (HPC), for example a 10 GigE network or an Infiniband network.

It is further noted that, although user system 128 is shown as a desktop computer in FIG. 1, that representation is provided merely by way of example. In other implementations, user system 128 may take the form of any suitable mobile or stationary computing device or system that implements data processing capabilities sufficient to provide a user interface, support connections to communication network 108, and implement the functionality ascribed to user system 128 herein. That is to say, in other implementations, user system 128 may take the form of a laptop computer, tablet computer, or smartphone, to name a few examples. Alternatively, in some implementations, user system 128 may be a "dumb terminal" peripheral device of system 100. In those implementations, display 129 may be controlled by hardware processor 104 of computing platform 102.

It is also noted that display 129 of user system 128 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 129 may be physically integrated with user system 128 or may be communicatively coupled to but physically separate from user system 128. For example, where user system 128 is implemented as a smartphone, laptop computer, or tablet computer, display 129 will typically be integrated with user system 128. By contrast, where user system 128 is implemented as a desktop computer, display 129 may take the form of a monitor separate from user system 128 in the form of a computer tower.

Figure 2:
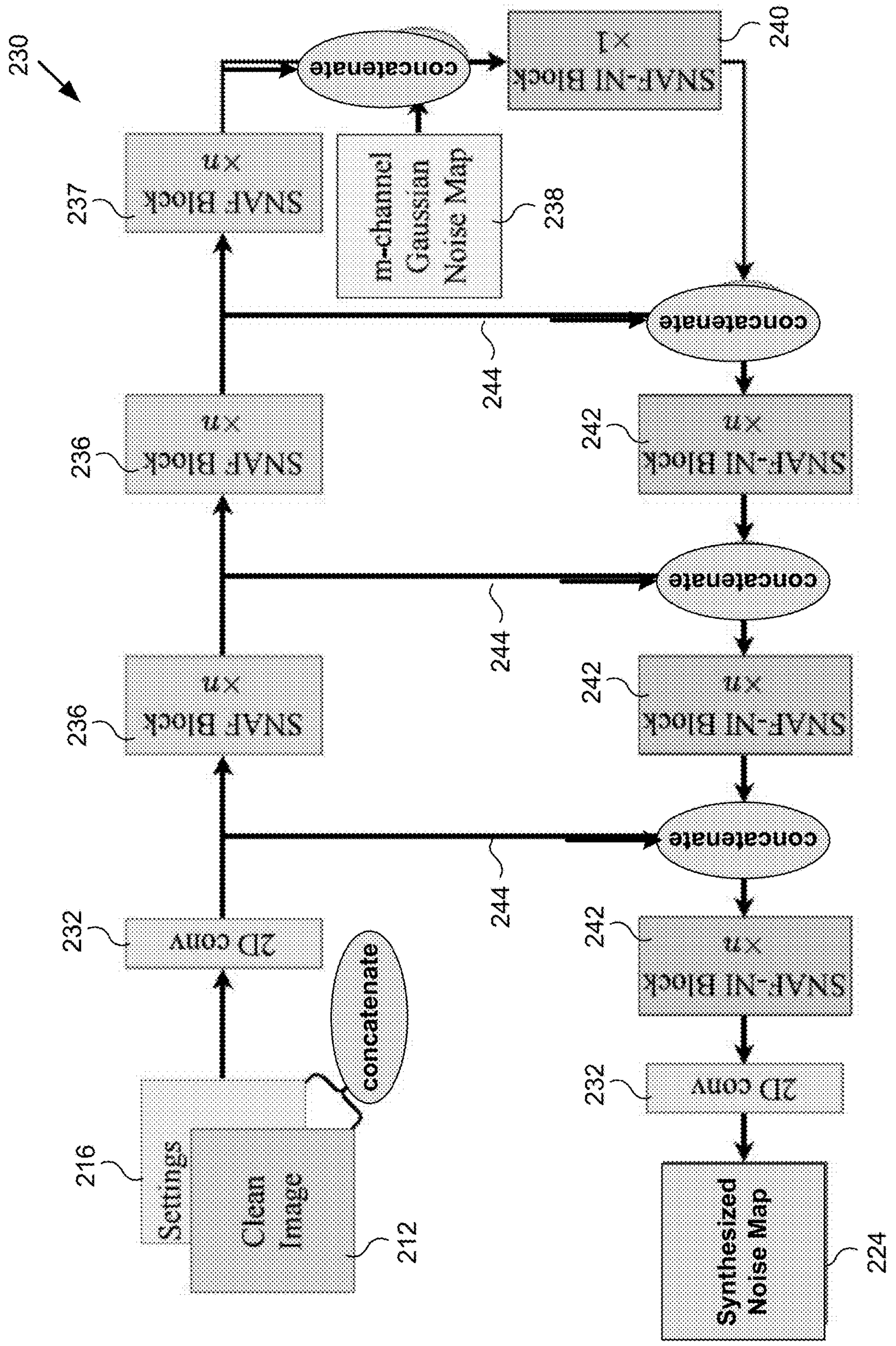
FIG. 2 shows an exemplary ML model architecture suitable for performing ML model-based image noise synthesis, according to one implementation.

FIG. 2 shows exemplary ML model architecture suitable for performing ML model-based image noise synthesis, according to one implementation. It is noted that ML model 230 may be included among ML model(s) 120 of system 100, in FIG. 1. According to the exemplary implementation shown in FIG. 2, encoder blocks 236 and 237 of ML model 230 are used to extract clean features (i.e., noise free features) from clean image 212 and one or more noise settings 216 (hereinafter "noise setting(s) 216") of a camera used to capture a version of clean image 212 that includes noise (i.e., noisy image 114 in FIG. 1). It is noted that clean image 212 and noise setting(s) 216 correspond respectively in general to clean image 112 and noise setting(s) 116, in FIG. 1. Consequently, clean image 212 and noise setting(s) 216 may share any of the characteristics attributed to respective clean image 112 and noise setting(s) 116 by the present disclosure, and vice versa.

At least one m-channel Gaussian noise map 238 is then concatenated to the latent bottleneck features (output of 237) as input to decoder block 240 of ML model 230, which acts as the source of the synthesized noise. The noises are sampled independently on each three-dimensional (3D) position with a standard deviation of one. Next, decoder blocks 242 with noise injections inside each decoder block 242 provided by skip connections (as further shown in FIG. 3B) are used to convert the Gaussian noise map into synthesized noise map 224. To reinforce the content-dependency, the decoding process conditioned on the clean features is allowed to be extracted in each stage, i.e., concatenating the clean features 244 to the decoded noises. For better separation of decoded noises and clean features, concatenation may be used instead of addition as skip connections 244.

It is noted that synthesized noise map 224, in FIG. 2, corresponds in general to synthesized noise map 124, in FIG. 1, and those corresponding features may share the characteristics attributed to either feature by the present disclosure. It is further noted that although ML model 230 is depicted in FIG. 2 as including three encoder blocks and four decoder blocks, that representation is merely provided as an example. In other implementations, ML model 230 may include more, or less, than three encoder blocks, and more, or less, than four decoder blocks.

Thus, as shown by FIG. 2, an ML model suitable for use in performing image noise synthesis according to the present concepts may be a ML model. As further shown in FIG. 2 by the presence of convolution layers 232 in exemplary ML model 230, in some implementations, such a ML model may take the form of a generative convolutional neural network (generative CNN). Moreover, each level of a generative CNN used to perform image noise synthesis as disclosed herein may have the same resolution. That is to say, ML model 230 may be configured to perform image noise synthesis without engaging in downs ampling or upsampling.

Figure 3A:
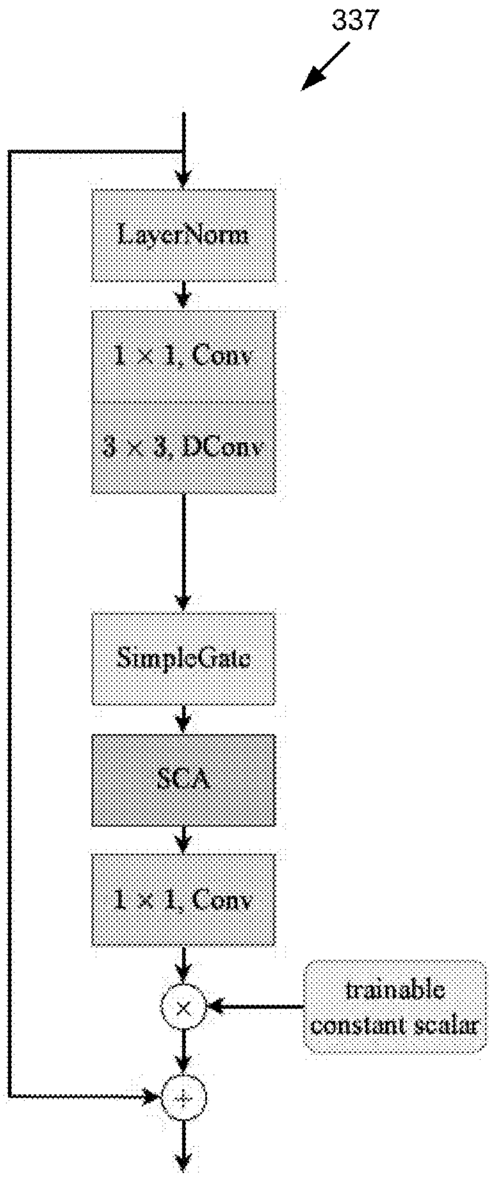
FIG. 3A shows a diagram illustrating an exemplary simplified Nonlinear Activation Free (SNAF) block suitable for use in an encoder of the ML model architecture of FIG. 2, according to one implementation.

Each encoder block 236 and 237 used in ML model 230 may be implemented as a sequence of simplified Nonlinear Activation Free (NAF) blocks (hereinafter "SNAF blocks"). FIG. 3A shows an exemplary implementation of a single SNAF block 337. It is noted that SNAF block 337 corresponds in general to the SNAF blocks included in each of encoder blocks 236 and 237, in FIG. 2. Due to the proven effectiveness of Layer Normalization, gating mechanism, and channel attention in many modern networks, those simple but powerful components are retained in SNAF block 337, and only the Feed Forward Network (FFN) present in conventional NAF blocks is removed to simplify the model, thereby transforming a conventional NAF block to SNAF block 337.

Figure 3B:
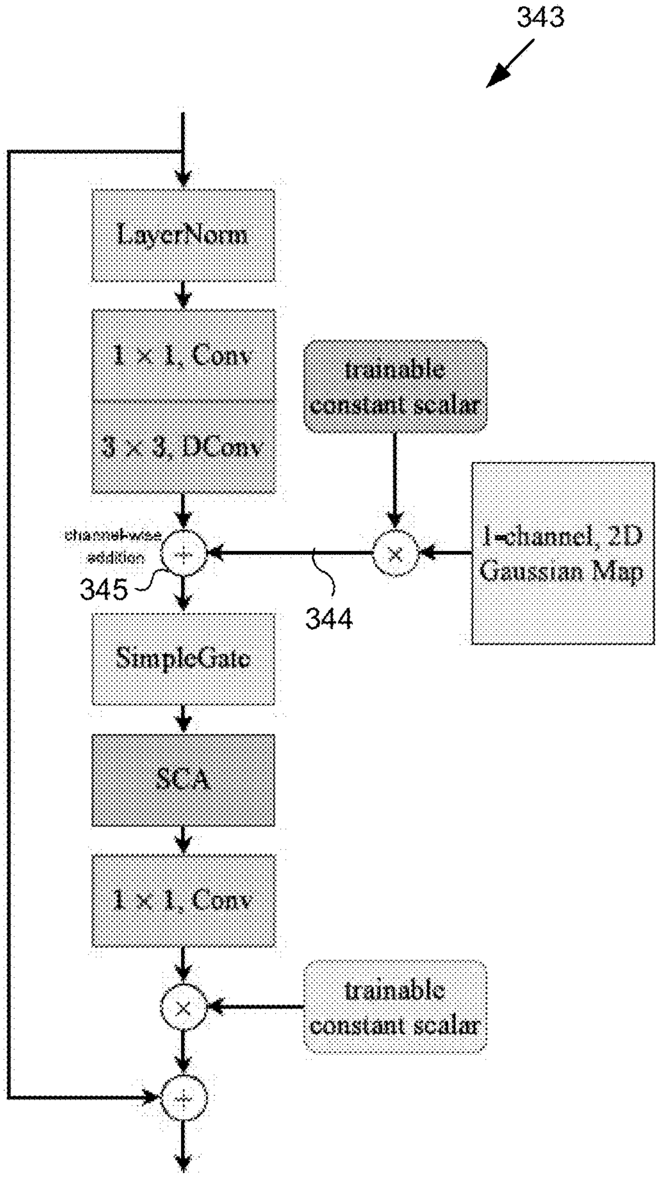
FIG. 3B shows a diagram illustrating an exemplary SNAF block receiving noise injection (SNAF-NI block0 suitable for use in a decoder of the ML model architecture of FIG. 2, according to one implementation.

Each decoder block 240 and 242 used in ML model 230 may be implemented as a sequence of SNAF blocks receiving noise injections 344 in FIG. 3B (hereinafter "SNAF-NI blocks"). FIG. 3B shows an exemplary implementation of SNAF-NI block 343. As shown in FIG. 3B noise injection 344 may occur between the convolution layer and the simple gating layer, thereby distinguishing SNAF-NI block 343 from SNAF block 337. It is noted that the injected noise may be a one-channel Gaussian noise map with the same spatial resolution as the deep features with channel-wise addition 345 applied. The noise value may be sampled independently on each spatial position. A trainable scalar may be used to control the variance of this Gaussian noise map and add it to each channel of the deep features, while another trainable scalar can be used to control the contribution of the injected deep feature, as shown in FIG. 3B.

Figure 4:
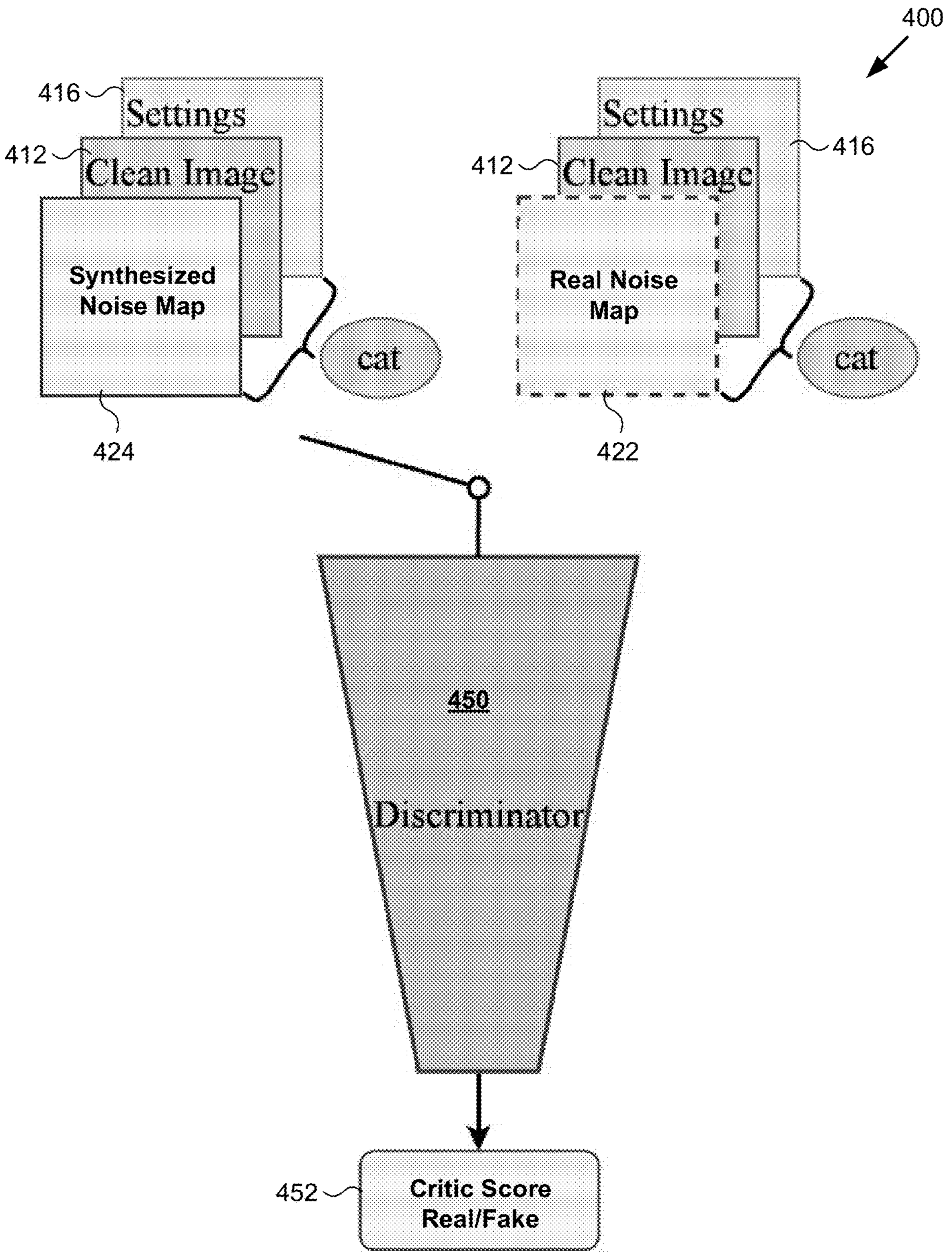
FIG. 4 shows a diagram illustrating a discriminator suitable for use while training an ML model to perform image noise synthesis, according to one implementation.

Referring to FIG. 4, FIG. 4 shows diagram 400 depicting the functionality of exemplary conditional discriminator 450 suitable for use in training ML model 230, in FIG. 2, according to one implementation. It is noted that conditional discriminator 450 may be included among ML model(s) 120 of system 100, in FIG. 1. As noted above, clean-noisy image pairs are used to train machine ML model 230 to predict a noise map by subtracting the clean image from the noisy one. The separation of the noise signal and clean image signal makes it much easier for conditional discriminator 450 to judge whether a sample belongs to the real distribution.

In addition to conditional discriminator 450, FIG. 4 shows clean image 412, one or more noise settings 416 (hereinafter "noise setting(s) 416"), real noise map 422, synthesized noise map 424, and critic score 452 output by conditional discriminator 450. It is noted that real noise map 422 is the difference between noisy image 114, in FIG. 1, and clean image 412, while synthesized noise map 424 refers to the noise prediction generated using ML model 230, in FIG. 2. It is further noted that clean image 412, noise setting(s) 416, and synthesized noise map 424 correspond respectively in general to clean image 112/212, noise setting(s) 116/216, and synthesized noise map 124/224, in FIGS. 1 and 2. Consequently, clean image 412, noise setting(s) 416, and synthesized noise map 424 may share any of the characteristics attributed to respective clean image 112/212, noise setting(s) 116/216, and synthesized noise map 124/224 by the present disclosure, and vice versa. In addition, real noise map 422, in FIG. 4, corresponds in general to real noise map 122, in FIG. 1, and those corresponding features may share any of the characteristics attributed to either feature by the present disclosure.

The functionality of exemplary conditional discriminator 450 depicted in FIG. 4 can be described as:

$$p = D(n^*, I, CM), \qquad \text{(Equation 1)}$$

where n* represents either real (ñ) noise map 122/422 or synthesized (n̂) noise map 124/224/424, 1 is clean image 112/212/412, D is conditional discriminator 450, CM is the control information provided by noise setting(s) 116/216/416 (hereinafter control map "CM"), and p is critic score 452. Real noise map 122/422 or synthesized noise map 124/224/424, along with clean image 112/212/412 and noise settings 116/216/416 are fed to conditional discriminator 450 symmetrically so that conditional discriminator 450 only needs to differentiate the conditional distribution.

Hardware processor 104 of system 100 may execute software code 110 to train ML model 230 based on critic scores 452 output by conditional discriminator 450. For example, hardware processor may execute software code 110 to provide a test input to conditional discriminator 450, the test input being one of: (i) clean image 112/212/412, synthesized noise map 124/224/424 generated by ML model 230, and noise setting(s) 116/216/416 or (ii) clean image 112/212/412, real noise map 122/422 derived from noisy image 114, and noise setting(s) 116/216/416. Hardware processor 104 can then execute software code 110 to determine, using conditional discriminator 450, whether the test input includes real noise map 122/422 or synthesized noise map 124/424, and train ML model 230 on that basis until conditional discriminator 450 is consistently fooled by the synthesized noise generated by ML model 230.

By way of overview of an image noise modeling and synthesizing process, the generation of one image noise sample can be formulated as:

$$\hat{n} = G(I, CM, n), \qquad \text{(Equation 2)}$$

where n̂ is synthesized noise map 124/224/424, G is ML model 230, and n is the Gaussian noise with a standard deviation of one.

The present image noise modeling and synthesis solution uses the standard conditional generative adversarial network (GAN) loss as discriminator loss and adversarial loss, which can be described by Equation 3 as:

$$\min_G \max_D V(D, G) = \mathbb{E}_{\tilde{n},I,CM\sim P_{data}(\tilde{n},I,CM)}\left\{\log D(\tilde{n}) + \mathbb{E}_{n\sim P_g(n)}[\log(1 - D(G(n)))]\right\}$$

where $P_{data}$(ñ, I, CM) represents sampling one clean noise image pair and its corresponding settings, and $P_g(n)$ represents sampling the Gaussian noise maps in the transition point and all decoder blocks. More specifically, Squared Error is used as the loss on critic scores 452, which can be described as:

$$\mathcal{L}_{disc} = \left[(1 - D(\tilde{n}))^2 + D(\hat{n})^2\right]/2, \qquad \text{(Equation 4)}$$

$$\mathcal{L}_{adv} = (1 - D(\hat{n}))^2, \qquad \text{(Equation (5)}$$

In addition to the use of standard conditional GAN loss, the present novel and inventive image noise modeling and synthesis solution introduces the use of style loss in noise modeling. Not only is the training process for ML model 230 stabilized by the addition of style loss, but the pattern of synthesized noise is advantageously closer to the pattern of the real noise without sacrificing the randomness.

Style loss has been used in Style Transfer tasks to measure the distance of two images in style space. Because style loss computes the distance between the Gram Matrices of two features, rather than the naive Euclidean distance between features, such supervision will not reduce the variation of synthesized noise. It is noted that minimizing the distance between Gram Matrices can be interpreted as a Maximum Mean Discrepancy (MMD) minimization process with the second-order polynomial kernel, which measures the distance between two distributions through the samples:

$$\mathcal{L}_{style} = \frac{1}{4M^2} MMD^2[\hat{n}, \tilde{n}], \quad \text{(Equation 6)}$$

where M is the number of pixels in one patch, and $\hat{n}$ represents the synthesized noise and $\tilde{n}$ represents the real noises. As such, the style loss effectively reasons on statistical properties which makes it a promising candidate to supervise the noise generation process.

A pre-trained Visual Geometry Group Network (VGG-Network) can be used to extract the perceptual features of real noise map 122/422 and synthesized noise map 124/224/424 and compute the average style loss with uniform weights over different layers, which can be formulated as:

$$\mathcal{L}_{style} = \frac{1}{L} \sum_{l=1}^{L} MSE\left(\text{Gram}_{\hat{n}}^{l}, \text{Gram}_{\tilde{n}}^{l}\right), \quad \text{(Equation 7)}$$

where L is the number of layers, MSE(·,·) is the Mean Squared Error loss, and $\text{Gram}^l$ is the Gram Matrix of the feature in layer l. Thus, ML model 230 may be trained using style loss to predict image noise.

Figure 5:
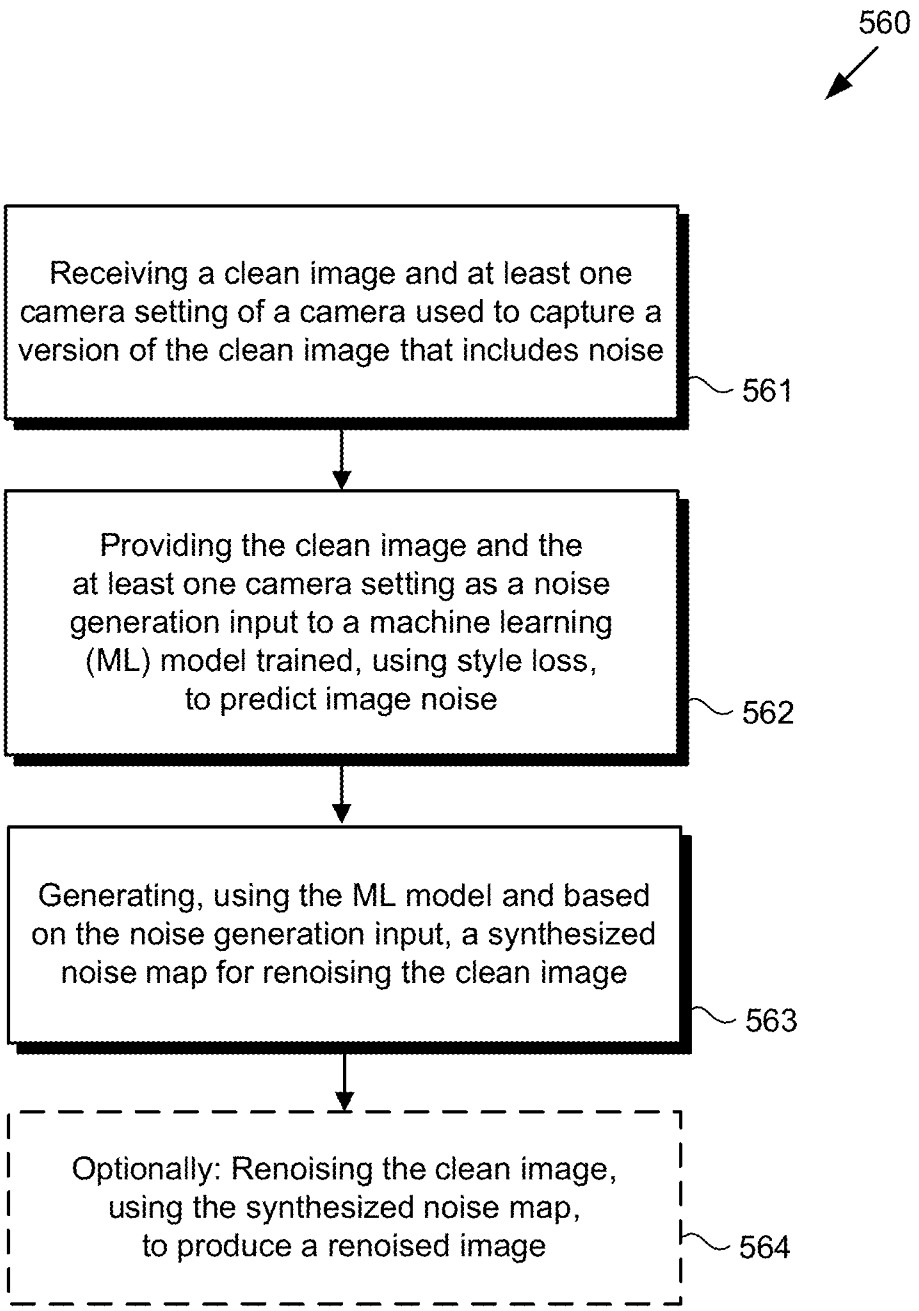
FIG. 5 shows a flowchart outlining an exemplary method for performing ML model-based image noise synthesis, according to one exemplary implementation.

The functionality of system 100 including software code 110 and ML model 230, shown in FIGS. 1 and 2, will be further described by reference to FIG. 5. FIG. 5 shows flowchart 560 outlining an exemplary method for performing ML model-based image noise synthesis, according to one exemplary implementation. With respect to the method outlined in FIG. 5, it is noted that certain details and features have been left out of flowchart 560 in order not to obscure the discussion of the inventive features in the present application.

Referring to FIG. 5 in combination with FIGS. 1 and 2, flowchart 560 includes receiving clean image 112/212 and noise setting(s) 116/216 of a camera used to capture noisy image 114, where noisy image 114 is a version of clean image 112/212 that includes noise (action 561). Clean image 112/212 may be obtained from a training dataset for ML model 230, or may be a denoised image, i.e., an image from which noise has been removed. In various use cases, the noise included in noisy image 114 may include digital camera noise or film grain noise. Exampled of noise setting (s) 116/216 may include one or more of camera brandmark, ISO sensitivity, and shutter speed, to name a few. As shown in FIG. 1, clean image 112/212 and noise setting(s) 116/216 may be received by system 100 via communication network 108 and network communication links 118. Clean image 112/212 and noise setting(s) 116/216 may be received in action 561 by software code 110, executed by hardware processor 104 of system 100.

Continuing to refer to FIG. 5 in combination with FIGS. 1 and 2, flowchart 560 further includes providing clean image 112/212 and noise setting(s) 116/216 as a noise generation input to ML model 230 (action 562). As noted above, ML model 230 may be trained using style loss to predict image noise. Clean image 112/212 and noise setting (s) 116/216 may be provided as a noise generation input to ML model 230, in action 562, by software code 110, executed by hardware processor 104 of system 100.

Continuing to refer to FIG. 5 in combination with FIGS. 1 and 2, flowchart 560 further includes generating, using ML model 230 and based on the noise generation input provided in action 562, synthesized noise map 124/224 for renoising clean image 112/212 (action 563). It is noted that there are several use cases in which renoising images may be advantageous or desirable. One such use case is content production, such as the production of movies, television programming, and streaming content, for example, in which different types of cameras introduce different camera noise to the content. In the post processing stage, the content produced using different cameras may be denoised and then renoised for consistency. Another use case for renoising is noise matching, in which content from a source providing substantially noise free content has noise added to it to match noise present in other content with which it is being combined.

As noted above, in various use cases, the noise included in noisy image 114 may include digital camera noise or film grain noise. In use cases in which the noise included in noisy image 114 is digital camera noise, as well as those in which the noise included in noisy image 114 is from film grain noise, synthesized noise map 124/224 may be generated in one of raw-RGB color space or sRGB color space, depending on whether the real noise was generated prior to processing of noisy image 114 by an Image Signal Processor (ISP) or after processing by the ISP, respectively. It is noted that the ISP typically introduces non-linear transformations and spatial mixing to the raw data. Therefore, the noise distributions in raw-RGB color space and sRGB color space deviate from each other. Although most existing approaches to noise modeling focus on one or the other of raw-RGB color space or sRGB color space, the present image noise modeling and synthesis solution can advantageously generalize to both color spaces. Generation of synthesized noise map 124/224 using ML model 230, in action 563, may be performed by software code 110, executed by hardware processor 104 of system 100.

Continuing to refer to FIG. 5 in combination with FIGS. 1 and 2, in some implementations flowchart 560 further includes renoising clean image 112/212, using synthesized noise map 124/224, to produce renoised image 125 (action 564). It is noted that action 564 is optional, and in some implementations may be omitted from the method outlined by flowchart 560. In implementations in which clean image 112/212 is renoised using synthesized noise map 124/224 to produce renoised image 125, that renoising may be performed by software code 110, executed by hardware processor 104 of system 100.

With respect to the actions described in flowchart 560, it is noted that actions 561, 562, and 563, or actions 561, 562, 563, and optional action 564, may be performed in a substantially automated process from which human involvement can be omitted.

The present approach to noise modeling and synthesis can also be adapted to provide a neural network model that can synthesize different types of noise with controllable parameters (hereinafter "noise parameter conditioning"). According to this approach, signal or content dependent parameters (hereinafter "content dependent parameters") are distinguished from signal or content independent parameters (hereinafter "content independent parameters"), which can each be described in generic terms. As an example, it is possible to describe those parameters using the weights of the heteroscedastic noise model. It is noted that content dependency in this use case means that the neural network model needs to condition the noise synthesis on the image. For example, the intensity of the noise might be inversely proportional to the color intensity values. By contrast, content independent parameters are unrelated to characteristics of the content and can be used synthesize noise values independently of the content.

Figure 6:
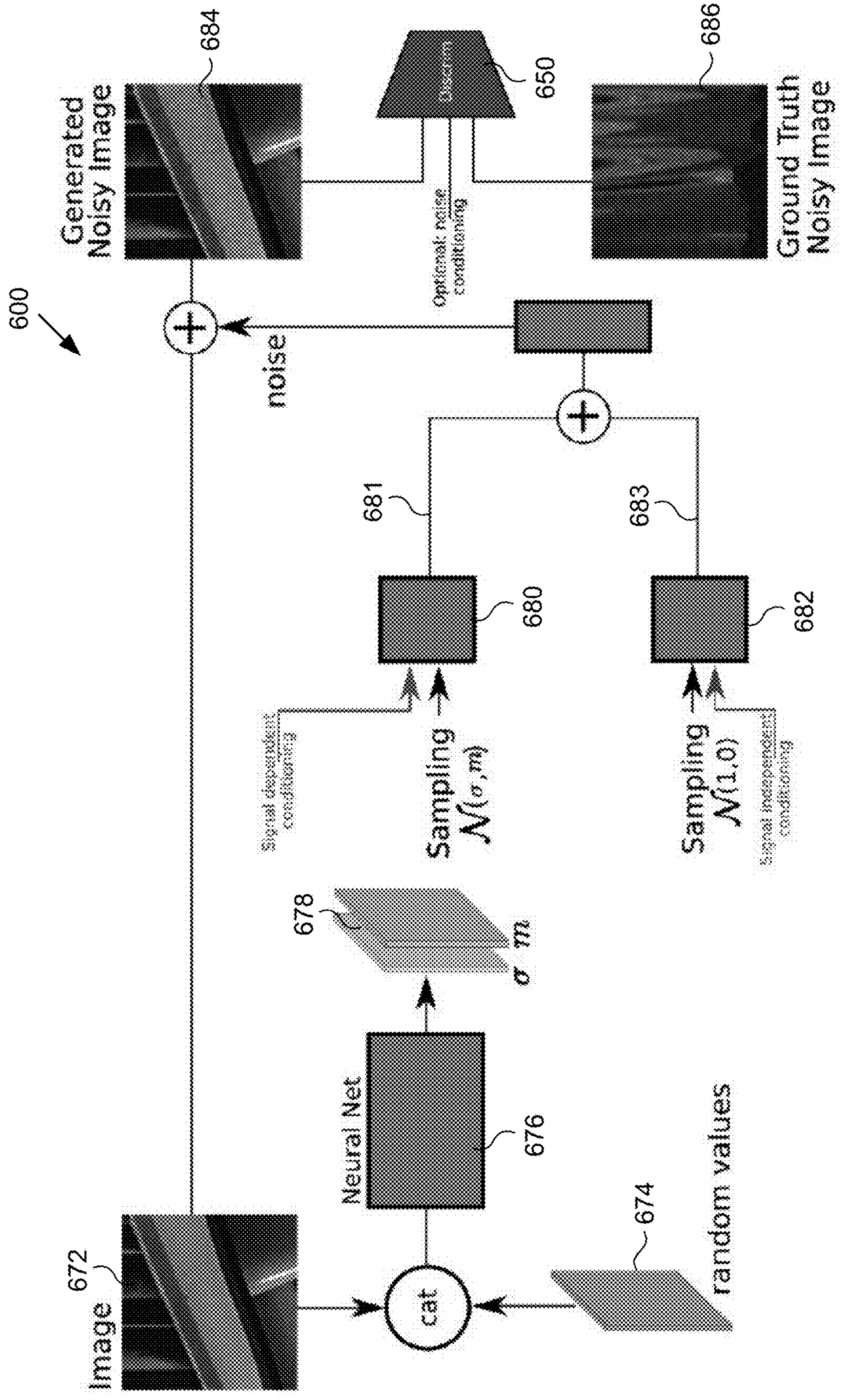
FIG. 6 shows a diagram illustrating an exemplary processing pipeline for performing noise parameter conditioning, according to one implementation.

Referring to FIG. 6, FIG. 6 shows a processing pipeline 600 for performing noise parameter conditioning, according to one implementation. For the content dependent parameters, image 672, with an additional random noise channel 674 in the form of a patch of random values having the same size as image 672, is processed using neural network 676 that predicts a two-channel output 678 of the same size as image 672. The outputs 678 are used to sample random values following Gaussian distribution. The random values are then further processed by additional neural network layers 680.

For the content independent parameters, random values are sampled following a normal distribution. The values are then processed by neural network 682. Finally, the respective content dependent branch output 681 and the content independent branch output 683 are summed and added to original image 684. To train the model, GAN training may be utilized, where the objective is to learn a noise generator that produces image noise that matches the distribution of noise in ground truth noisy images 686. Depending on the exact training setting and dataset, discriminator 650 may be conditioned on the noise parameters. It is noted that discriminator 650 may correspond in general to conditional discriminator 450, in FIG. 4, and those corresponding features may share any of the characteristics attributed to either feature by the present disclosure.

Figure 7:
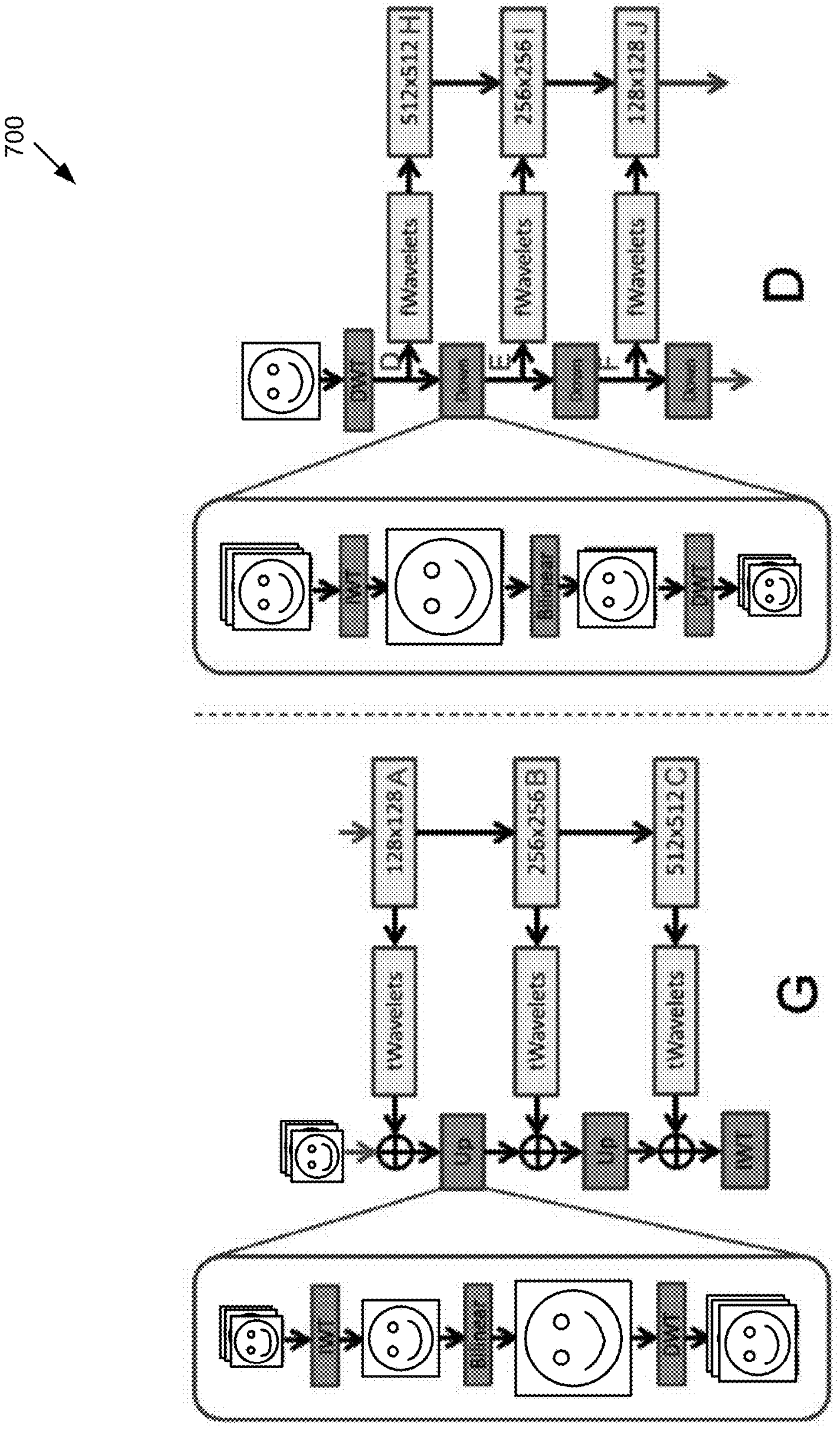
FIG. 7 shows a diagram depicting a process for synthesizing film grain noise, according to one implementation.

As yet another variant application focused on synthesizing film grain noise, a Style-based Wavelet-driven GAN (SWAGAN) model for which the generative process is conditioned on a clean image may be utilized. In the case of the generator, the wavelet transform of the downscaled clean image may be concatenated at the points A, B, and C, of the SWAGAN model as shown by diagram 700, in FIG. 7. In the case of the discriminator, the wavelet transform of the downscaled image may be concatenated at the points D, E, and F of the SWAGAN model as also shown in FIG. 7. Analogously to the model used in noise parameter conditioning described above by reference to FIG. 6, training may be done using a dataset of images containing digital camera noise, film grain noise, or digital camera noise and film grain noise.

Thus, the present application discloses systems and methods for performing ML model-based image noise synthesis that address and overcome the deficiencies in the conventional art. The present image noise synthesis solution advances the state-of-the-art in several ways, including providing a generic network architecture and solution for digital camera noise modeling and synthesis in raw-RGB color space or sRGB color space, film grain noise modeling and synthesis, as well as accurate noise modeling that achieves quantitatively and qualitatively superior noise modeling performance for different sensors and noise settings. In addition, the present image noise modeling and synthesis solution advantageously enhances artistic control by providing control maps that give artists a way to control the synthesized digital camera noise and film grain noise in accord with their creative intent. Moreover, the present solution may be utilized with multiple different formats available in multiple forms, e.g., for movie production, including command-line interfaces running natively or on proprietary containers or plugins.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor; and a system memory storing a software code;

the hardware processor configured to execute the software code to:

train a machine learning (ML) model using a discriminator to predict image noise by:

providing a test input to the discriminator, the test input being one of: (i) a test clean image, a test synthesized noise map generated by the ML model based on the test clean image and at least one test noise setting of a test camera used to capture a noisy version of the test clean image, and the at least one test noise setting, or (ii) the test clean image, a real noise map derived from the noisy version of the test clean image, and the at least one test noise setting; and determining, using the discriminator, whether the test input includes the real noise map or the test synthesized noise map.

2. The system of claim 1, wherein the system is configured to:

receive a clean image and at least one noise setting of a camera used to capture a version of the clean image that includes noise;

provide the clean image and the at least one noise setting as a noise generation input to the ML model; and generate, using the ML model and based on the noise generation input, a synthesized noise map for renoising the clean image.

3. The system of claim 1, wherein the ML model comprises a generative convolutional neural network (CNN).

4. The system of claim 2, wherein the ML model includes a plurality of encoder blocks and a plurality of decoder blocks, each of the plurality of encoder blocks and each of the plurality of decoder blocks including a respective plurality of simplified Nonlinear Activation Free (SNAF) blocks.

5. The system of claim 4, wherein a noise output of each of the plurality of encoder blocks is injected into a respective one of the plurality of decoder blocks.

6. The system of claim 2, wherein the noise in the version of the clean image comprises at least one of digital camera noise or film grain noise.

7. The system of claim 6, wherein the synthesized noise map is generated by the ML model in a raw Red-Green-Blue (raw-RGB) color space.

8. The system of claim 6, wherein the synthesized noise map is generated by the ML model in a standard Red-Green-Blue (sRGB) color space.

9. The system of claim 1, wherein the system is further configured to:

renoise, using the synthesized noise map, the clean image to produce a renoised image.

10. The system of claim 1, wherein the ML model comprises a generative convolutional neural network (CNN), and wherein each level of the generative CNN has a same resolution.

11. A method comprising:

training a machine learning (ML) model using a discriminator to predict image noise by:

providing a test input to the discriminator, the test input being one of: (i) a test clean image, a test synthesized noise map generated by the ML model based on the test clean image and at least one test noise setting of a test camera used to capture a noisy version of the test clean image, and the at least one test noise setting, or (ii) the test clean image, a real noise map derived from the noisy version of the test clean image, and the at least one test noise setting; and determining, using the discriminator, whether the test input includes the real noise map or the test synthesized noise map.

12. The method of claim 11, further comprising:

receiving a clean image and at least one noise setting of a camera used to capture a version of the clean image that includes noise;

providing the clean image and the at least one noise setting as a noise generation input to the ML model; and generating, using the ML model and based on the noise generation input, a synthesized noise map for renoising the clean image.

13. The method of claim 11, wherein the ML model comprises a generative convolutional neural network (CNN).

14. The method of claim 12, wherein the ML model includes a plurality of encoder blocks and a plurality of decoder blocks, each of the plurality of encoder blocks and each of the plurality of decoder blocks including a respective plurality of simplified Nonlinear Activation Free (SNAF) blocks.

15. The method of claim 14, wherein a noise output of each of the plurality of encoder blocks is injected into a respective one of the plurality of decoder blocks.

16. The method of claim 12, wherein the noise in the version of the clean image comprises at least one of digital camera noise or film grain noise.

17. The method of claim 16, wherein generating the synthesized noise map is performed by the ML model in a raw Red-Green-Blue (raw-RGB) color space.

18. The method of claim 16, wherein generating the synthesized noise map is performed by the ML model in a standard Red-Green-Blue (SRGB) color space.

19. The method of claim 11, further comprising:

renoising using the synthesized noise map, the clean image to produce a renoised image.

20. The method of claim 11, wherein the ML model comprises a generative convolutional neural network (CNN), and wherein each level of the generative CNN has a same resolution.

* * * * *